(12) United States Patent
Crenko

(10) Patent No.: US 9,784,979 B2
(45) Date of Patent: Oct. 10, 2017

(54) MAGNIFYING BOTTLE ASSEMBLY WITH IMPROVED SEALING CAPABILITY

(71) Applicant: Thomas Crenko, Bethlehem, PA (US)

(72) Inventor: Thomas Crenko, Bethlehem, PA (US)

(*) Notice: Subject to any disclaimer, the term of this patent is extended or adjusted under 35 U.S.C. 154(b) by 72 days.

(21) Appl. No.: 14/944,346

(22) Filed: Nov. 18, 2015

(65) Prior Publication Data

US 2017/0139216 A1    May 18, 2017

(51) Int. Cl.
| | |
|---|---|
| *G02B 7/02* | (2006.01) |
| *G02B 27/02* | (2006.01) |
| *B65D 51/24* | (2006.01) |
| *B65D 41/06* | (2006.01) |
| *B65D 53/02* | (2006.01) |
| *B65D 50/04* | (2006.01) |

(52) U.S. Cl.
CPC ............ *G02B 27/027* (2013.01); *B65D 41/06* (2013.01); *B65D 51/24* (2013.01); *B65D 53/02* (2013.01); *G02B 7/02* (2013.01); *G02B 7/022* (2013.01); *G02B 27/02* (2013.01); *G02B 27/021* (2013.01); *B65D 50/043* (2013.01)

(58) Field of Classification Search
CPC .... G02B 27/027; G02B 27/021; G02B 27/02; G02B 7/022; G02B 7/02; B65D 41/00; B65D 51/24
USPC .................. 359/809, 808, 811, 819, 829, 830
See application file for complete search history.

(56) References Cited

U.S. PATENT DOCUMENTS

| | | | | |
|---|---|---|---|---|
| 2,961,108 A | * | 11/1960 | Johnson | B65D 51/24 206/459.5 |
| 3,827,592 A | * | 8/1974 | Deussen | B65D 50/067 215/215 |
| 4,747,497 A | * | 5/1988 | Holman | B65D 79/005 215/230 |
| 4,998,632 A | * | 3/1991 | Morris, Sr. | B65D 50/041 215/201 |
| 5,309,279 A | * | 5/1994 | Halstead | A61J 7/04 359/442 |
| 5,351,845 A | * | 10/1994 | Hunter | B65D 50/061 215/204 |
| 5,760,975 A | | 6/1998 | DiGiovanni | |
| 6,036,017 A | * | 3/2000 | Bayliss, IV | A61J 1/03 206/459.5 |
| 6,065,623 A | * | 5/2000 | Hierzer | G09F 19/12 215/230 |

(Continued)

OTHER PUBLICATIONS

U.S. Appl. No. 10/807,411, filed Sep. 29, 2005, Mulr.

(Continued)

*Primary Examiner* — Bumsuk Won
*Assistant Examiner* — William R Alexander
(74) *Attorney, Agent, or Firm* — Fitzpatrick Lentz & Bubba, PC; Douglas Panzer

(57) ABSTRACT

A magnifying bottle assembly, comprising a cap; further comprising a cap housing and a magnifying lens. Said magnifying lens provides a radially extended portion, further comprising an integral retaining ring oriented upwardly for engaging said cap housing, and a gasket engaging ring oriented downwardly for engaging a gasket. Said retaining ring is oriented with respect to said radially extended portion so as to form a pressure channel. The magnifying bottle assembly further comprises a container suitable for engaging said cap.

9 Claims, 4 Drawing Sheets

(56) References Cited

U.S. PATENT DOCUMENTS

| | | | | |
|---|---|---|---|---|
| 6,081,392 A * | 6/2000 | Pensmith | ............ | G02B 25/002 |
| | | | | 359/440 |
| 6,278,545 B1 * | 8/2001 | Napier | .................... | B65D 5/42 |
| | | | | 359/440 |
| 6,366,401 B1 * | 4/2002 | Gonda | ................ | G02B 25/002 |
| | | | | 206/769 |
| 6,549,345 B1 * | 4/2003 | Cardarelli | ............ | G02B 25/002 |
| | | | | 359/440 |
| 8,505,766 B2 * | 8/2013 | Aitchison | ............ | G02B 25/005 |
| | | | | 220/694 |
| 8,844,722 B2 | 9/2014 | Wang | | |
| 2005/0211656 A1 * | 9/2005 | Muir | ...................... | B65D 51/24 |
| | | | | 215/228 |
| 2010/0133139 A1 * | 6/2010 | Lowe | .................... | B65D 83/04 |
| | | | | 206/534 |
| 2012/0223045 A1 | 9/2012 | Burke, Jr. | | |
| 2013/0263424 A1 * | 10/2013 | Giocastro | ............. | B65D 83/04 |
| | | | | 29/428 |
| 2016/0120756 A1 * | 5/2016 | Nazginov | ............. | A61J 1/1418 |
| | | | | 116/201 |
| 2016/0130049 A1 * | 5/2016 | Rogers | ............... | B65D 47/0842 |
| | | | | 215/201 |

OTHER PUBLICATIONS

Nature-Watch, "Bug Viewer: Insect Viewer—Bug Box", https://www.nature-watch.com/bug-viewer-p-391.html.

HABA USA, "Terra Kids Beaker Magnifier—Children's Science Toy | HABA USA", http://www.habausa.com/terra-kids-beaker-magnifier.html.

* cited by examiner

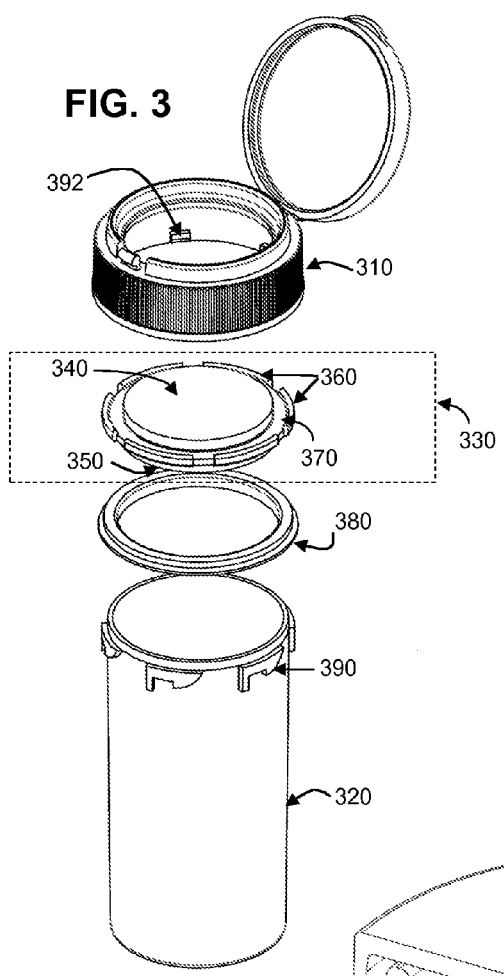
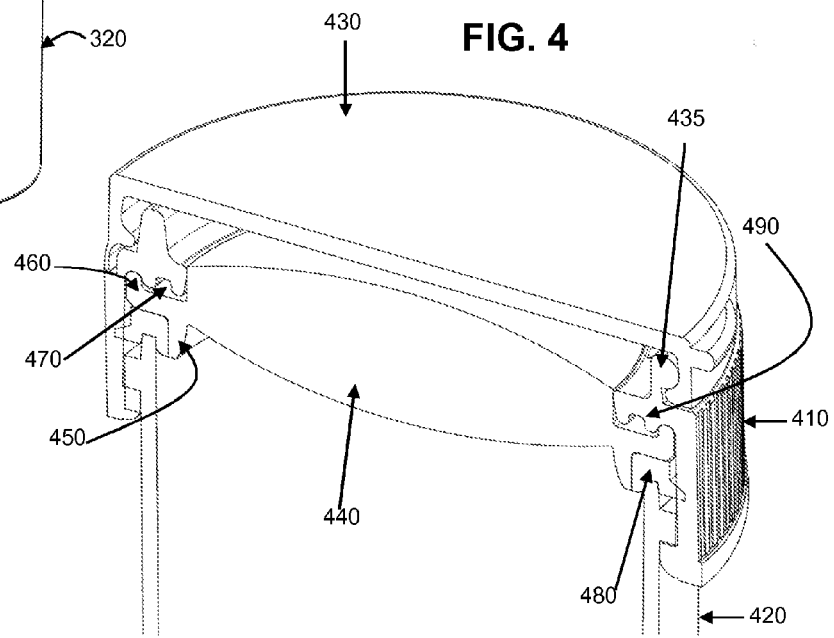

MAGNIFYING BOTTLE ASSEMBLY WITH IMPROVED SEALING CAPABILITY

FIELD OF THE INVENTION

The present invention relates generally to a bottle and magnification end cap and more particularly to a bottle and magnification end cap permitting a magnified view of the contents of the bottle and effecting a stabilized seal between the magnification end cap and the bottle when the magnification end cap and bottle are engaged.

BACKGROUND

The use of a magnification device is known in the prior art for combination with jars, bottles and other containers, such as medicine bottles: for example U.S. Pat. No. 5,760,975 to DiGiovanni and U.S. application Ser. No. 10/807,411 by Muir; and specimen containers: for example Nature-Watch Bug Viewer and HABA Terra Kids Beaker Magnifier.

Prior art magnifying caps, or cap and bottle assemblies, have failed to integrate magnification means for viewing of the internal contents of the attached container with sealing properties sufficient to provide for stability of the container's contents and durability of the magnifying end cap itself. Relatedly, those containers in the prior art that do include magnifying means, such as U.S. Pat. No. 5,760,975 to DiGiovanni or U.S. Pat. No. 8,844,722 to Wang, fail to direct and apply the forces between the cap and container components to stabilize and secure the magnifying means within the cap to ensure security of the components of the container and cap, or the seal between the cap and container. This results in lack of reliability and durability of the magnifying cap itself and further prevents the designs of the prior art from achieving seals between the cap components or between the cap assembly and container portion sufficient to provide stable storage for the bottle's contents and protection of the contents from the deleterious effects of exposure to outside air, outside liquids, contaminants and the like.

Therefore, a need remains for an improved magnifying bottle assembly with improved sealing capability that provides a magnified view of the contents of a bottle, coupled with improved sealing ability for stable storage of those contents.

BRIEF SUMMARY OF THE INVENTION

The present invention is a magnifying bottle assembly with improved sealing capability including a cap, an integrated magnifying means, a sealing portion and a container. A cap portion of the assembly is comprised of a cap housing, a magnifying lens and a gasket. The magnifying lens is radially extended to engage with the inner diameter of the cap housing and arranged so that the optically magnifying portion of the lens coincides with an open area of the cap housing so that, when assembled, the cap assembly, including the magnifying lens, provides a magnified image of the contents of a container portion of the bottle and cap assembly. The magnifying lens is further comprised of a retaining ring to be engaged by the cap housing and a gasket retaining ring to engage the included gasket. The gasket retaining ring not only holds the gasket, but further acts to stabilize the placement of the gasket with respect to the other portions of the bottle and cap assembly, as further described herein. The cap portion, when engaged with a container portion of the bottle and cap assembly, effectuates a seal between the cap portion and container portion by transfer of force from the cap housing through a pressure channel integral to the magnifying lens, and contact between the magnifying lens, gasket and container portion, thereby permitting secure storage of contents, such as medicines, biology samples, specimens and the like, within the container portion of the bottle and cap assembly. The magnifying bottle assembly with improved sealing capability provides magnification of the contents of the container portion, as well as other benefits including stable storage of the contents of the assembly and the prevention of the entrance of air or liquid into the sealed container and the effects of the interaction of such fluids with the contents of the assembly.

Embodiments of the present invention, as described further herein, may further include child safety mechanisms and an integral or separable lens cover.

Magnifying bottle assemblies with improved sealing capability consistent with the teachings of the present disclosure, as described above and as further described herein, permit the stable storage of the contents of the bottle and cap assembly and permit one to view the contents of the bottle and cap assembly optically magnified.

BRIEF DESCRIPTION OF THE DRAWINGS

FIG. 3 is an exploded view of one embodiment of a magnifying bottle assembly in accordance with the present invention.

FIG. 4 is a sectional view of FIG. 1 along a diametric line through its center.

DETAILED DESCRIPTION OF THE INVENTION

The invention of the present disclosure is described below with reference to certain embodiments. While these embodiments are set forth in order to provide a thorough and enabling description of the invention, these embodiments are not set forth with the intent to limit the scope of the disclosure. A person of skill in the art will understand that the invention may be practiced in numerous embodiments, of which those detailed here are merely examples. In order to allow for clarity of the disclosure of the claimed invention, structures and functions well known to those skilled in the art are not here disclosed. Those skilled in the art should also realize that equivalent magnifying bottle assemblies with improved sealing capability do not depart from the spirit and scope of the invention in its broadest form.

Figure 1:
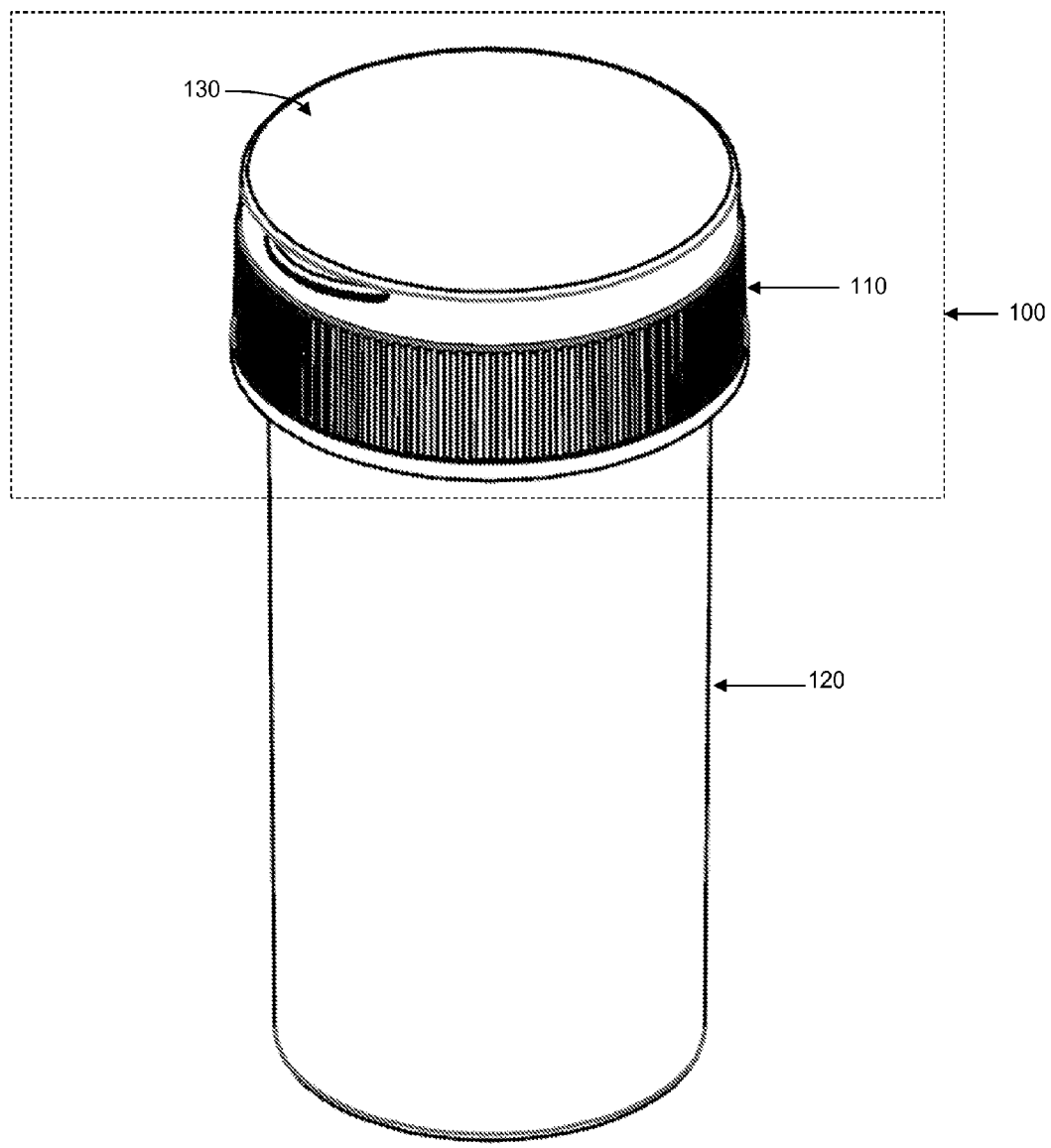
FIG. 1 and FIG. 2 are perspective views of a magnifying bottle assembly in accordance with the present invention.

FIG. 1 shows a perspective view of a magnifying bottle assembly in accordance with the present disclosure. As shown, a cap 100 includes a cap housing 110 and a lens cover 130, which is hingedly connected to the cap housing 110. The cap is designed to engage with a container 120. It will be understood that the cap 110 and container 120 can be engaged in numerous ways known to those of skill in the art, such as, without limitation, by complementary threaded segments for screwing the cap 100 onto the container 120; or by the engagement of lug portions 140 on one of the cap or container for engaging recesses or seats on the other of the cap or container. In this embodiment, the hingedly connected lens cover 130 is shown in an open position. In its closed position, the lens cover mechanically engages the cap housing, and such engagement may be reinforced by use of a latch or other known closure methods.

Figure 2:
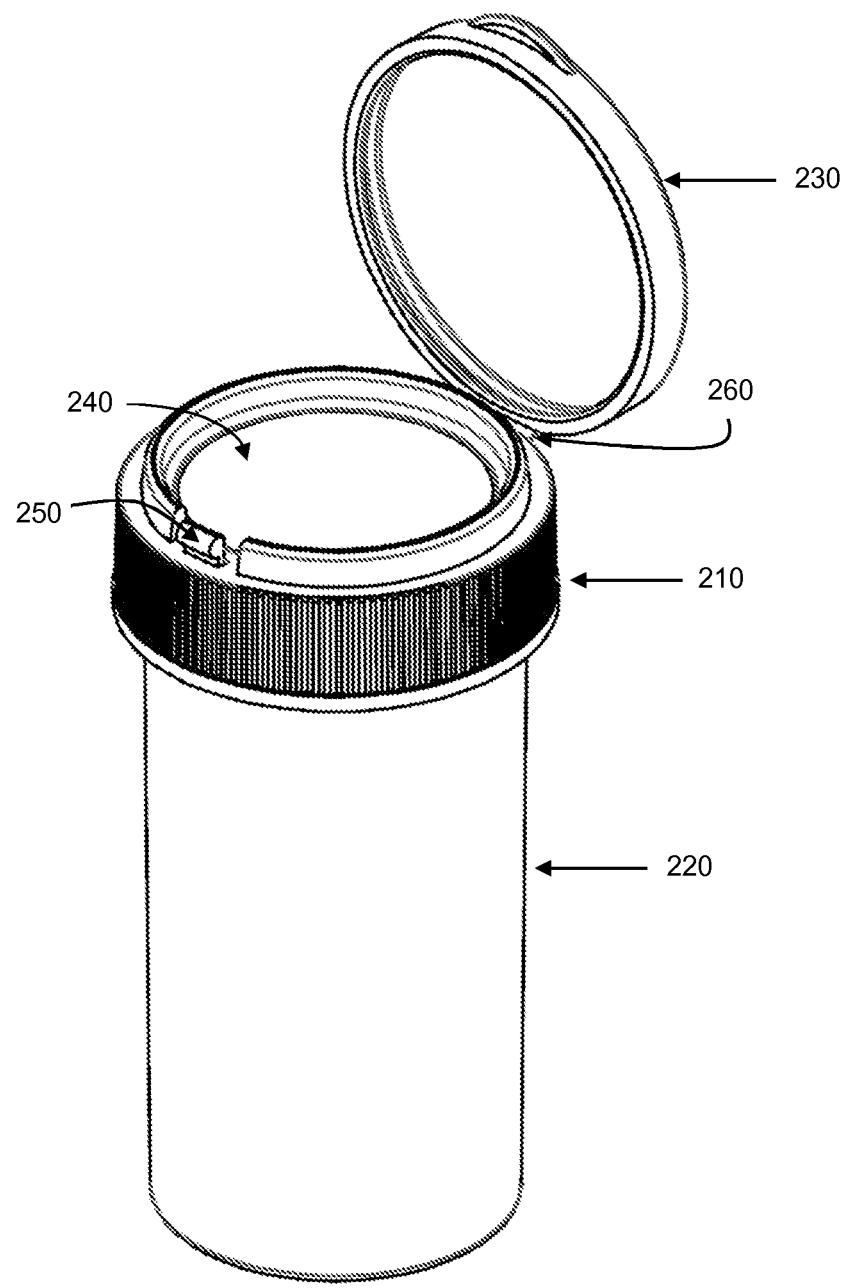

FIG. 2 shows a perspective view of an embodiment of a magnifying bottle assembly such as that of FIG. 1. In this exemplary embodiment, a lens cover 230 is connected to a cap housing 210 by a hinge 260. The cap housing 210, lens cover 230 and hinge 260 are formed as integral portions of a single, molded plastic unit by known methods. This unit is also molded to include a latch 250 for engaging the lens cover 230 when closed and securing the lens cover in its closed position. A magnifying lens 240 is engaged with the cap housing 210 forming a seal and thereby, with the cap housing 210 completing a cap suitable for providing closure when engaged with the container 220 shown.

The mechanical engagement between the magnifying lens 240 and cap housing 210 may be effected in various ways. By way of non-limiting example, the magnifying lens 240 may be formed with an apron portion extending radially from the outer circumference of the lens, which may snap into the underside of the cap housing 210. In such example, the diameter of the integral lens and apron may be marginally smaller than the diameter of the inside of the cap housing, thereby allowing friction or contact force between the lens and cap housing to maintain the engagement. More secure or permanent methods of effecting such engagement may include inserting the magnifying lens 240 into the mold for the cap housing 210 and molding the cap around the magnifying lens, thereby creating a mechanical connection that reduces or eliminates the ability of the lens to be removed from the cap assembly and provides watertight and airtight properties. This process of molding the cap housing 210 around the magnifying lens 240 is further amenable to variation. For example, as taught in U.S. Pat. No. 6,710,945 to Miranda, the lens may be secured by molding the cap housing 210 around the entire circumference of the lens 240. The lens may alternatively be formed to include struts extending from sections of the lens' circumference or from sections of the circumference of an apron around the lens, which struts are in turn secured in the molded cap housing. This may, for example, be accomplished by snapping said struts into recesses in the inner area of the cap housing or by molding the cap housing around the struts, as described in the previous example.

Further still, the lens 240 may be secured to the cap housing 210 by welding or by the use of an adhesive preparation.

It will be understood by one of skill in the art that variations of the structure described above will not deviate from the scope of this disclosure. For example, the method of forming the cap housing 210, lens cover 230 and hinge 260 may be accomplished other than by use of a single mold. Likewise, the disclosed embodiments both above and below should not be read as limited to the use of plastic or other specific polymer and the choice of material for the lens 240 and the cap housing 210 may affect the ability to employ a particular method of securing the two pieces to one another.

Further, some embodiments may include a lens cover but employ means other than the use of a hinge for connecting the lens cover to the cap housing, or may omit connection of the lens cover to the cap housing altogether. Additionally, some embodiments may use other means for securing shut the lens cover. One non-limiting example is the use of a magnetic closure wherein the opposite magnetic poles are placed in or on the lens cover and the cap housing, respectively. In still further embodiments of the magnifying bottle assembly, the cap portion will not include a lens cover and, therefore, will neither include a latch or other means for securing closed a lens cover.

FIG. 3 illustrates an exploded view of an exemplary embodiment of the present invention. A cap 310 is shown, including an integral lens cover portion. The cap is formed by injection molding to include a plurality of lugs 392 on the interior of the cap 310. These lugs 392 operate in conjunction with child-safe seats 390 of a container 320 to permit the magnifying bottle assembly to be closed in a child-safe manner. A magnifying insert 330 is formed as a unit, integrally including a lens 340 for magnification of the contents of the bottle when such contents are viewed through the lens, a pressure channel 370 formed as an apron extending radially along the circumference of the lens 340, a retaining ring 360 upwardly disposed at the outer circumference of the pressure channel 370 and a gasket retaining ring 350 downwardly disposed on the underside of the magnifying insert 330. The diameter of the magnifying insert 330, and as a consequence the location of the retaining ring 360 is selected to coincide with the diameter of the cap 310 and to permit the magnifying insert 330 to be securely snapped into the cap in a way that creates a mechanical connection between the magnifying insert 330 and the underside of the cap 310, allowing the lens 340 to be disposed partially through an open segment of the cap 310. As such, the diameter of the lens 340 is selected to coincide with the diameter of the opening in the cap 310. The aforementioned diametric measurements will thereby also determine the location and size of the pressure channel section 370 of the magnifying insert 330.

The placement of the gasket retaining ring 350 on the underside of the magnifying insert 330 is selected to permit engagement of the gasket retaining ring 350 with a gasket 380, preferably of silicone or other rubber material, whose inner diameter matches the outer diameter of the gasket retaining ring 350, which causes the gasket to be arranged so as to contact the top edge of the container 320 and assist in the creation of the desired seal. In embodiments such as the one described, where a non-rigid gasket material is employed, the engagement of the gasket 380 and container 320 will cause the gasket to partially protrude into the inner circumference formed by the top edge of the container. The gasket retaining ring 350 further provides stabilization of the gasket, including the portions contacting the top edge of the container and the portion protruding inside this circumference of the top edge of the container 320. This, in turn, provides for improved, stable sealing. As is further illustrated in and described with respect to figure FIG. 4, the assembly of the parts shown in FIG. 3 permit the magnifying bottle assembly to be closed, effecting child-safe protection, providing airtight and liquid tight properties, and providing a magnified view of the contents of the container portion 320 of the magnifying bottle assembly through the lens 340.

The inclusion of the gasket retaining ring 350, retaining ring 360, and pressure channel 370, in combination with the gasket 380 and the design of the cap housing 310 and container 320 stabilize and secure the cap assembly, and as a result its component gasket 380 and magnifying insert 330, in way superior to known devices of the prior art. This is due to the combination of lateral stability provided by the gasket retaining ring 350 and retaining ring 360, and the sealing forces between the gasket 380, container 320, pressure channel 370, and cap housing 310.

Turning now to FIG. 4, there is shown a sectional view of the upper portion of the novel magnifying bottle assembly with improved sealing capability. The cap 410 is shown engaged with the container 420. The hingedly connected lens cover 430 of the cap is closed and is secured in the closed position by the latch 435. The magnifying lens portion 440 in this exemplary embodiment is round and terminates at its circumference in an upwardly disposed integral retaining ring 460. The diameter of the magnifying lens portion 440 is substantially equal to or marginally smaller than the inner diameter of the cap housing 410 so as to provide a flush fit of the magnifying lens portion into the cap housing. The integral retaining ring 460 effectuates mechanical engagement between the magnifying lens 440 and the cap housing 410. The magnifying lens 440 further includes a downwardly disposed gasket retaining ring 450, which is integral to the magnifying lens 440. This gasket retaining ring 450 maintains mechanical engagement of a gasket 480 with an outer diameter substantially equal to the inner diameter of the cap housing 410 and inner diameter sufficient to permit the circumference of the gasket to engage the circumference of the container portion 420 of the magnifying bottle assembly. The gasket 480 is thereby disposed between the gasket retaining ring 450 and the inner surface of the cap housing 410. The cap housing 410 is further designed to include a pressure transfer portion 490 for transferring mechanical pressure from the cap housing 410 to the magnifying lens 440 and gasket 480 by the pressure transfer point's contact with the integral pressure channel 470 portion of the magnifying lens. By use of this assembly, closing the magnifying bottle assembly exerts pressure from the forces between the child-safe lugs and recesses or other closure mechanism (such as threads) between the cap housing 410 and container 420, through the pressure transfer portion 490 of the cap housing to the pressure channel 470 of the magnifying lens 440 and then the gasket 480. In combination with the laterally stabilizing function of the gasket retaining ring 450 a seal is effected. The stability of the gasket retaining ring 450 itself may be influenced by the design of the same by shortening or extending its length, thereby causing it to extend further into the container 420 or less so, as the case may be. The act of engaging and closing the cap causes a downward force to be applied from the cap housing 410, to the pressure channel 470 by the downward displacement of the pressure transfer portion 490. In conjunction with the stabilization provided by the gasket retaining ring 450 the gasket 480 is substantially centered and is engaged with the circumference of the top edge of the container portion 420, thereby effecting an airtight and water-tight sealing of the magnifying bottle assembly, protecting its contents from spoilage, leakage or other undesired result. In some embodiments this engagement of the gasket 480 may instead be arranged to occur at the inner circumference of the container 420.

Figure 5:
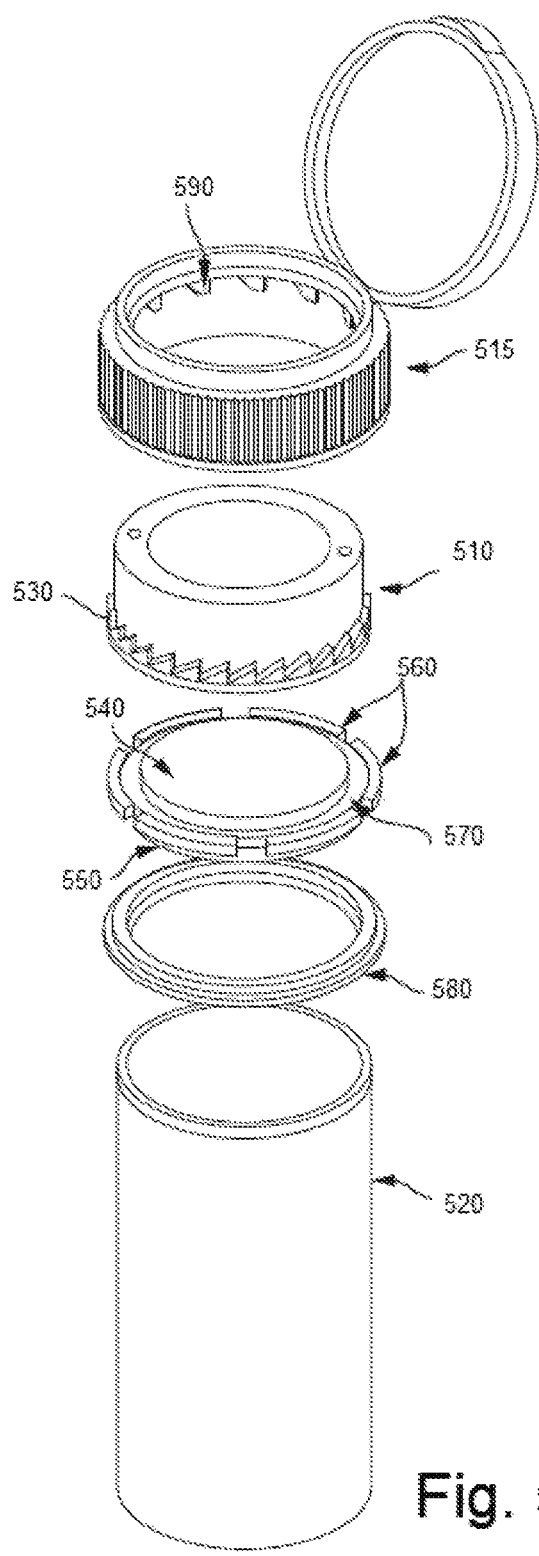
FIG. 5 is an exploded view of one embodiment of a magnifying bottle assembly in accordance with the present invention.

FIG. 5 illustrates an exploded view of another exemplary embodiment of the present invention effecting a child resistant closure. A cap housing 510 is shown with a first plurality of extruded engaging teeth 530 disposed on its outer circumference. An outer cap housing 515 is shown with a second plurality of extruded engaging teeth 590 disposed on its inner circumference. The outer cap housing 515 engages with the cap housing 510, such as by snapping the cap housing 510 frictionally into the outer cap housing 515. However, the outer cap housing will rotate freely about the cap housing unless downward force is placed upon the outer cap housing, causing the first and second plurality of extruded engaging teeth 530, 590 to engage, whereby rotational force applied to the outer cap housing will be transferred to the cap housing due to the engagement of the first and second plurality of extruded engaging teeth, permitting the cap to be removed from the bottle 520. Similar to other embodiments disclosed herein, the magnifying insert comprised of lens 540, upwardly disposed retaining ring 560, gasket retaining ring 550, and pressure channel 570, permit stable sealing of the bottle assembly by engagement with the gasket 580 and magnified view of the contents of the bottle 520.

It will be understood that the material of the gasket 480 may be chosen to meet the sealing requirements of the assembly for a particular use and therefore the seal effected by engagement of the cap assembly and the container portion may be substantially airtight and water-tight and that complete airtight and water-tight are not requirements of all embodiments of the present invention.

As discussed herein, particularly with respect to FIG. 2, the lens cover 430 and/or hinge and latch may be omitted or otherwise disposed upon the cap housing in embodiments of the present invention.

While various disclosed embodiments have been described above, it should be understood that they have been presented by way of example only, and not limitation. Numerous changes to the subject matter disclosed herein can be made in accordance with this disclosure without departing from the spirit or scope of this disclosure. In addition, while a particular feature may have been disclosed with respect to only one of several implementations, such feature may be combined with one or more other features of the other implementations as may be desired and advantageous for any given or particular application.

What is claimed is:

1. A magnifying bottle assembly comprising:
   a. A cap;
   b. Said cap further comprising a cap housing and a magnifying lens;
   c. Said magnifying lens having a radially extended portion further comprising an integrally formed retaining ring oriented upwardly for engaging said cap housing, and a gasket engaging ring oriented downwardly for engaging a gasket;
   d. Said retaining ring oriented with respect to said radially extended portion so as to form a pressure channel;
   e. A container suitable for engaging said cap.

2. The magnifying bottle assembly of claim 1 wherein said cap housing in injection-molded around a periphery of said radially extended portion of said magnifying lens.

3. The magnifying bottle assembly of claim 1 wherein said container further comprises a child-safe seat and said cap further comprises a child-safe lug for engaging said child-safe seat.

4. The magnifying bottle assembly of claim 1 further comprising a lens cover portion.

5. The magnifying bottle assembly of claim 4 wherein said lens cover portion is hingedly attached to said cap housing.

6. The magnifying bottle assembly of claim 4 wherein said camp housing further comprises an integral latch portion arranged to engage said lens cover portion when closed.

7. The magnifying bottle assembly of claim 1 or 2 wherein said cap further comprises an outer cap housing portion, said cap housing having a first plurality of extruded engaging teeth disposed on its outer circumference and said outer cap housing having a second plurality of extruded engaging teeth disposed on its inner circumference; said first and second plurality of extruded engaging teeth arranged to mechanically connect said cap housing portion and said outer cap housing portion, and said outer cap housing portion rotating freely about said cap housing portion when said first and second plurality of extruded engaging teeth are not so engaged, thereby preventing opening of said magnifying bottle assembly.

8. The magnifying bottle assembly of claim 7 further comprising a lens cover portion.

9. The magnifying bottle assembly of claim 8 wherein said lens cover portion is hingedly attached to said outer cap housing.

* * * * *